United States Patent [19]

Bernard

[11] 3,970,112

[45] July 20, 1976

[54] CONTROL VALVE

[75] Inventor: James A. Bernard, Dayton, Ohio

[73] Assignee: General Motors Corporation, Detroit, Mich.

[22] Filed: Dec. 8, 1975

[21] Appl. No.: 638,967

[52] U.S. Cl. .............................. 137/807; 137/251
[51] Int. Cl.² ................... F16K 9/00; F16K 31/06
[58] Field of Search .................. 137/1, 251, 807; 251/139, 65

[56] References Cited
UNITED STATES PATENTS

| | | | |
|---|---|---|---|
| 936,074 | 10/1909 | Annable | 251/139 X |
| 2,869,818 | 1/1959 | Fleuret | 137/251 X |
| 3,010,471 | 11/1961 | Gross | 137/251 |
| 3,406,704 | 10/1968 | Van Fosser | 137/251 |
| 3,463,365 | 8/1969 | Fillon | 137/251 X |
| 3,485,254 | 12/1969 | Ernst | 137/807 |

Primary Examiner—William R. Cline
Attorney, Agent, or Firm—K. H. MacLean, Jr.

[57] ABSTRACT

A refrigerant control valve for an air conditioning system including a flow passage formed by a tubular member of non-magnetizable material encircled by an annularly shaped electromagnetic coil. The electromagnet is housed in a shell having an inner cylindrical wall located adjacent the tubular member and which extends from one end of the shell toward the second end and terminating therebetween to form an end surface. The second end of the housing shell has a threaded opening which encircles the tubular member and into which a calibration nut or member extends. The calibration member has an end surface which is spaced closely from the end surface of the cylindrical wall by rotation of the calibration member to produce a desired magnetic field therebetween when the electromagnetic coil is energized. The magnetic field across the end surfaces attracts an accumulation of small iron particles which are mixed with the refrigerant to the inner wall of the tubular member in a location near the spaced end surfaces and thereby restricts fluid flow through the tubular member.

2 Claims, 2 Drawing Figures

CONTROL VALVE

This invention relates to a refrigerant control valve for an air conditioning system or the like and, more particularly, to a control valve in which fluid flow through a tubular passage is regulated by an encircling electromagnet which produces a magnetic field to attract an accumulation of small iron particles in the flow passage, thereby creating a flow restriction.

Refrigerant systems in general, and particularly automobile air conditioning systems, have previously used expensive and relatively complex flow control valves to regulate refrigerant flow. Specifically, it is desirable to employ a throttling type flow control valve between the evaporator and the compressor to maintain refrigerant pressure therein above a level corresponding to freezing temperatures. This prevents frost formation, which is obviously undesirable. Prior throttling valves have utilized pressure or temperature responsive actuators and sensors to control movement of a valve member. The resultant throttling action caused by the valve maintains sufficient evaporator pressure to prevent freezing.

Expansion valves for air conditioning systems also employ movable valve members and, like the aforedescribed throttling valve, control refrigerant flow. Both types utilize a relatively large number of parts, some of which move or slide. This amounts to a relatively complex assembly whose utility may be affected by valve sticking or by any other mechanical problem. Replacement of these valves requires discharging the refrigerant from the system and subsequently refilling the system, which involves a substantial expense.

The subject control valve has only a few parts, none of which are movable during valve operation. Consequently, the valve would be a relatively inexpensive item. Because moving parts are eliminated, the valve cannot stick or jam and thereby the durability should be substantially better. Specifically, the valve includes a tubular member of non-magnetizable material such as copper or brass, encircled by an annularly shaped electromagnet which is housed within an iron shell, also of annular configuration. Magnetic poles are formed by spaced end surfaces on an inner cylindrical wall of the shell and a calibration member which is threaded into one end of the shell. Adjustment of the gap between the end surfaces by rotation of the calibration member permits external calibration of the control valve.

In cooperation with the aforedescribed control valve which produces spaced magnetic poles which encircle the tubular flow member, a quantity of finely divided iron particles is mixed with the refrigerant and lubricating oil of the air conditioning system. When the electromagnet is energized, the iron particles are attracted to and held in the vicinity of the spaced magnetic poles just inside the tubular flow member. An accumulation of iron particles decreases the flow area through the tubular member and would restrict fluid flow in the manner of a suction throttling valve. When the subject valve is used as a throttling valve to prevent evaporative freeze-up, coil energization might be accomplished by a simple pressure responsive device or by an external temperature sensor. If used in place of an expansion valve, a voltage level control might be utilized to provide a variable flow restriction to control refrigerant supply to the evaporator according to particular operating conditions. Numerous temperature responsive controls are readily available which could be used to regulate coil energization in the aforedescribed manner.

In the preferred embodiment illustrated and described hereinafter, the electro-magnetic coil is supported within a housing shell which encircles a tubular flow control member of non-magnetizable material. The inner wall of the shell extends from one end toward a second end but terminates midway therebetween, forming an end surface. A threaded calibration member is supported around the tubular member and has an end surface adapted to be spaced from the end surface of the shell. The calibration member extends through the other end of the shell so that by turning the calibration member, the spacing between the end surfaces is changed.

Therefore, an object of the invention is to provide an inexpensive and yet reliable control valve for fluid flow in which a flow restriction is achieved by the accumulation of small iron particles in the flow passage produced by the attraction created by magnetic poles thereabout.

A still further object of the invention is to provide a fluid flow control device, including a flow-forming member of non-magnetizable material encircled by electromagnetic coil means within a shell or housing which forms spaced pole members around the flow-forming member, including an adjustable calibration member threadably extending through one end of the housing so that the gap between the spaced pole members may be externally adjusted.

Further objects and advantages of the present invention will be more readily apparent from the following detailed description, reference being had to the accompanying drawings in which a preferred embodiment is illustrated.

Figure 1:
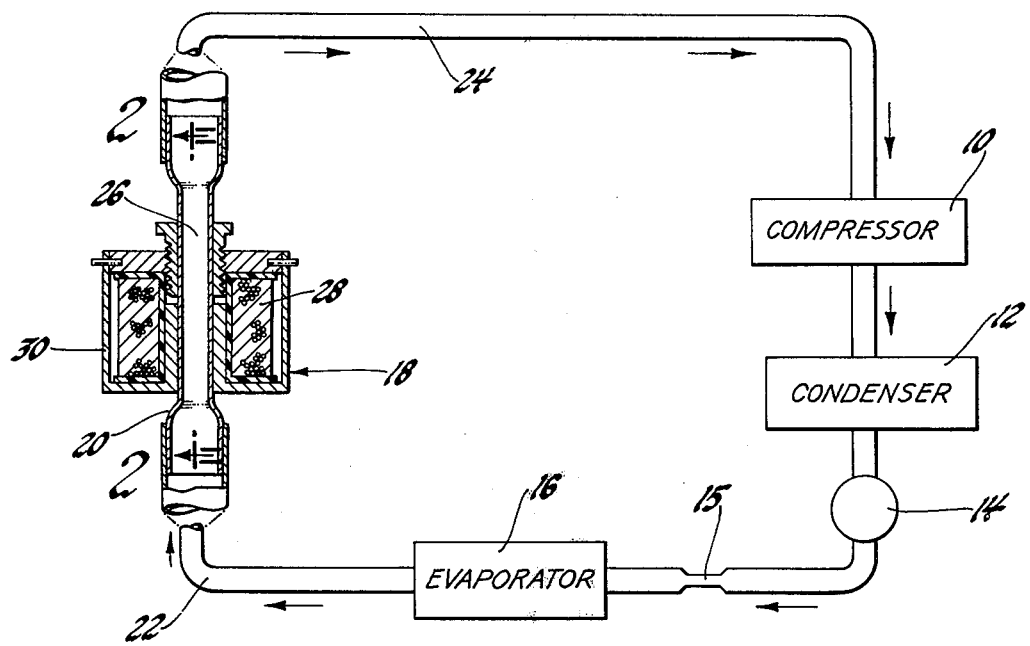
FIG. 1 is a somewhat schematic view of an automotive air conditioning system, including a sectioned view of the subject control valve in an open operative condition.

In FIG. 1 of the drawings, an automobile air conditioning fluid circuit is shown, including in fluid flow relationship, a compressor 10, a condenser 12, a receiver-dehydrator 14, a restrictor 15 to decrease refrigerant pressure, an evaporator 16, and a suction line flow control valve 18 located between the evaporator and the compressor. The control valve 18 is so placed to regulate the quantity of refrigerant which may be evacuated from the evaporator by the compressor and thereby prevent its pressure from falling below freeze levels.

During certain periods of operation, the capacity of the compressor to pump refrigerant and to evacuate refrigerant from the evaporator may exceed the capacity of the evaporator to produce vaporized refrigerant which is caused by absorption of heat from the air and resultant boiling of liquid refrigerant. The excess of the pumping capacity of the compressor over the cooling or heat-absorbing capacity of the evaporator will result in a lowering of evaporator pressure. This decrease in pressure is accompanied by a decrease in the refrigerant temperature. Ultimately, the external finned surfaces of the evaporator fall below a freezing level and frost accumulation on the evaporator occurs. If allowed to progress, the frost may block air flow through the evaporator. The purpose of the control valve 18 is to limit the flow of refrigerant out of the evaporator and thus maintain evaporator pressure above a level needed to prevent frost accumulation.

The aforementioned frost-producing conditions occur typically when the air conditioning system is operated in a relatively low ambient temperature environment, say 70° F. Running the compressor at relatively high speeds during a highway trip produces excess pumping capacity with respect to the heat-absorbing capacity of the evaporator. The amount of heat which may be absorbed by the evaporator is generally limited by the difference in temperature between the air passing therethrough and the refrigerant therein, as well as the configuration and size of the evaporator. Thus, the quantity of vaporous refrigerant which can be removed from the evaporator by the compressor is limited without decreasing evaporator pressures below a value corresponding to freeze conditions.

Heretofore, a throttling valve device has been employed between the evaporator and the compressor to regulate the quantity of refrigerant discharged from the evaporator in response to evaporator pressure or temperature conditions. The subject control valve performs this throttling function and has several desirable characteristics, as discussed previously.

The control valve 18 includes a tubular flow passage member 20, one end of which is attached to conduit 22 which, in turn, is connected to the evaporator outlet. The other end of the member 20 is attached to the suction line 24, which is fluidly connected to the compressor inlet. The member 20 is of non-magnetizable material, such as copper or a brass, and includes a reduced diameter portion which defines a flow control throat or passage 26.

The valve includes an annularly configured electromagnetic coil 28 which is enclosed in a housing or shell means 30. The electromagnet 28 includes a plurality of coils or wraps about a non-conductive sleeve 32. Leads 34, 36 encased in insulation 34', 36', extend through openings in the housing 30 and are adapted to be connected to a control sensor associated with the evaporator 16.

The housing 30 includes an inner cylindrical wall member 38 which encircles the tubular member 20. Wall 38 extends from a first end of the housing 30 toward the second end but terminates therebetween, creating the end surface 40. The second end of the housing means 30 is formed by an end member 42 which has a threaded opening 44. The end member 42 is removable from the member 30 so as to permit insertion of the coil assembly 28 within the housing. Members 30 and 42 are held together by pins 46.

A calibration nut or member 48 is threadably inserted in opening 44 and includes an end surface 50 which can be moved toward surface 40 by rotating member 48 in threaded opening 44. Thus, the air gap between the surfaces 40, 50 is varied by a simple external operation to provide desirable spacing between the surfaces.

The diameter of the flow control passage or throat 26 is selected for a particular air conditioning system to provide adequate flow from the evaporator to the compressor for predetermined cooling of a passenger compartment during operation under relatively high ambient temperature conditions, say 100° F. The throat 26 is formed by a rolling operation to realize a desired diameter. Likewise, the ends of member 20 are expanded after placement of the coil assembly. When a voltage is applied across the leads 34, 36 of coil 28, current flows through the coil and produces a magnetic field which extends across the gap formed by end surfaces 40, 50. North and South poles are formed on either side of the gap between members 38 and 48. The intensity of the magnetic field or the flux density thereacross may be varied by increasing or decreasing the voltage applied to coil 60. As previously explained, the spacing between surfaces 40 and 50 also affects the magnetic field in the vicinity of the poles. The polarity of the leads 34 and 36 is not critical except that it affects the relative designation of surfaces 40, 50 as North and South.

The control valve 18 operates to restrict fluid flow between the evaporator and the compressor by decreasing the flow area through the throat 26. When the coil 38 is energized, the magnetic field across and in the vicinity of the end surfaces 40, 50 attracts a large plurality of tiny iron particles against the inside of member 20. The iron particles are thoroughly mixed with and carried by the refrigerant and oil of the air conditioning system. The iron particles are characterized by extremely small dimensions which resultantly will not otherwise affect the operation of the air conditioning system and, more particularly, will not cause wear. The particles are desirably in the order of approximately 100 angstrom in dimension. Obviously, in an automotive air conditioning system having up to five pounds of refrigerant, the number of iron particles will be extremely large. These iron particles are carried with the refrigerant and lubricating oil throughout the air conditioning system and because of their small size do not interfere with or create any appreciable wear of the metal surfaces, such as in the compressor. A source for the magnetic particles is the Ferro-fluidics Corporation of Burlington, Mass.

In the embodiment illustrated in the drawings, the inner diameter of the flow control passage or throat 26 is about 7/16 of an inch. The inner diameter of the coil is about 0.6 inches and the outside diameter is about 1.6 inches. Approximately 625 turns of No. 22 copper wire coated with an insulation such as Formvar is wrapped in an annular configuration about the nylon sleeve 32. Thus, there is almost 200 feet of wire in the illustrated coil 28. Normally, the calibration member 48 is turned into the opening 44 of the end cap so as to space the surface 50 from surface 40 in the vicinity of approximately ⅛ inch. This distance may be readily changed by rotating the member 48 as previously explained. Members 30, 42 and 48 are preferably made of iron or low carbon steel which forms a good path for the conduction of a magnetic field. As previously mentioned, member 20 is made of a non-magnetic material, such as copper or a brass.

Figure 2:
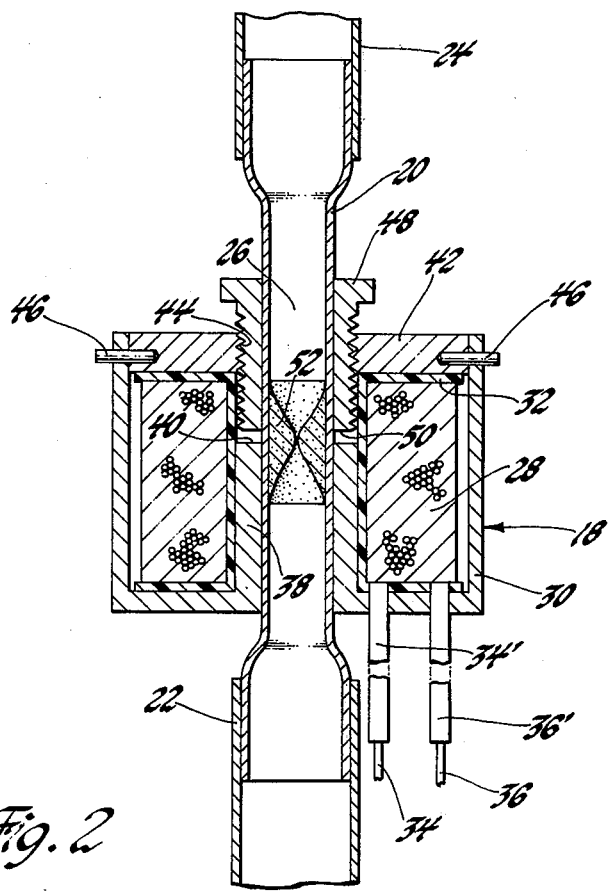
FIG. 2 is an enlarged sectioned view of the control valve looking in the direction of arrows 2—2 in FIG. 1 and in a closed operative condition.

In FIG. 2, the control valve 18 is shown with the coil 28 energized. As previously explained, this produces magnetic poles of the end surfaces 40 and 50, thereby attracting a plurality of fine iron particles thereabout. The accumulation of the iron particles against the inner wall of member 20 in the vicinity of the poles eventually creates an annular collar designated by the numeral 52. As the voltage applied to coil 28 is increased, the magnetic field becomes stronger and the attraction of iron particles greater, which will cause a greater accumulation of iron particles until the annular restriction 52 extends completely across the flow passage 26 to block refrigerant flow. When the voltage across leads 34 and 36 is removed, the magnetic field collapses and the force holding together the iron particles is broken. After the collapse of the magnetic field, the iron particles return to their previous state of mixture with the refrigerant and oil of the refrigerant system.

The embodiment of the invention previously described and shown in the drawings has been tested satisfactorily. The test utilized to measure the efficiency of the valve is called an air pressure test. A quantity of iron particles is introduced to the vicinity of the surfaces 40 and 50 within passage 26. A predetermined voltage is then applied to the coil and an air pressure applied to the inlet of the valve. The air pressure is increased until flow is initiated through the valve. Various readings have been taken at different voltage levels. The results achieved show that with a 12-volt potential, air pressure in excess of 60–75 psi could consistantly be contained.

Although the embodiment illustrated is a preferred embodiment, other embodiments may be contemplated which still fall within the scope of the following claims which define the invention.

What is claimed is as follows:

1. A flow control valve for a fluid having a quantity of small magnetic particles mixed therewith comprising: a tubular member of non-magnetizable material defining an intermediate control passage between end portions serving as an inlet and an outlet, respectively; an electromagnetic coil assembly with a substantially annular configuration encircling the intermediate portion of the tubular member and including multiple turns of conductive wire thereabout; said coil assembly including a housing of readily magnetizable material having an inner cylindrical wall closely encircling said intermediate portion and extending partially from one end toward a second end, terminating therebetween to form an end surface; said second end of the housing having an opening therein spaced from the intermediate portion of said tubular member; a calibration member closely encircling said intermediate portion and extending through the opening in said second end; said calibration member having an end surface movable with respect to said first end surface by insertion and withdrawal through the opening in said second end of the housing; said housing and said calibration member being of readily magnetizable material, such as iron, whereby when said coil means is energized, a magnetic field is produced in said housing and calibration member extending between the spaced surfaces to create magnetic poles thereof which attract a plurality of iron particles from said refrigerant to the inner wall of said intermediate portion, thereby creating an annular accumulation of particles to decrease the flow area.

2. A flow control valve for a fluid having a quantity of small magnetic particles mixed therewith comprising: a tubular member of non-magnetizable material defining an intermediate control passage between end portions serving as an inlet and an outlet, respectively; hollow housing means of readily magnetizable material having an annular configuration encircling said intermediate portion; an electromagnetic coil within said housing and encircling said intermediate portion; said housing means having an inner cylindrical wall closely encircling said intermediate portion and extending partially from one end of the housing means toward a second end, terminating therebetween to form an end surface; said second end of said housing having a threaded opening therein spaced radially from said intermediate portion; a calibration member closely encircling said intermediate portion and having a threaded cylindrical outer surface for engaging said threaded opening in said second end so that rotation of said calibration member will cause it to move into or out of the housing interior; said calibration member having an end surface which is adapted to be spaced from said other end surface on said inner cylindrical wall a distance defined by rotation of said calibration member, thereby permitting a convenient external adjustment of the spacing; whereby energization of said coil means creates magnetic poles of said end surfaces to attract a plurality of iron particles from said fluid to the inner surface of said intermediate portion in an annular configuration, thereby decreasing the flow area and creating a flow restriction.

* * * * *